United States Patent
Huebsch et al.

(10) Patent No.: US 12,448,771 B2
(45) Date of Patent: *Oct. 21, 2025

(54) FOAM ENVELOPE FOR SEALING LARGE VOLUMES

(71) Applicants: DUPONT SAFETY & CONSTRUCTION, INC., Wilmington, DE (US); DDP Specialty Electronic Materials US, LLC., Wilmington, DE (US)

(72) Inventors: Eric Huebsch, Medingen (LU); Lars Massueger, Zurich (CH); Cedric Thomi, Sezenove (CH)

(73) Assignees: DDP SPECIALTY ELECTRONIC MATERIALS US, LLC, Wilmington, DE (US); DUPONT SAFETY & CONSTRUCTION, INC., Wilmington, DE (US)

( * ) Notice: Subject to any disclaimer, the term of this patent is extended or adjusted under 35 U.S.C. 154(b) by 224 days.

This patent is subject to a terminal disclaimer.

(21) Appl. No.: 18/135,545

(22) Filed: Apr. 17, 2023

(65) Prior Publication Data

US 2023/0340778 A1    Oct. 26, 2023

Related U.S. Application Data

(60) Provisional application No. 63/332,807, filed on Apr. 20, 2022.

(51) Int. Cl.
*E04B 1/68*    (2006.01)
*B29C 44/18*    (2006.01)

(52) U.S. Cl.
CPC .......... *E04B 1/6812* (2013.01); *B29C 44/188* (2013.01); *E04B 1/6816* (2013.01)

(58) Field of Classification Search
CPC .... E04B 1/6812; E04B 1/6816; E04B 1/6807; E04B 1/6813; E04B 1/6815;
(Continued)

(56) References Cited

U.S. PATENT DOCUMENTS

| | | | |
|---|---|---|---|
| 5,078,231 A | * | 1/1992 | Davis .................... E06C 7/42 D25/68 |
| 5,093,055 A | | 3/1992 | Skiff |

(Continued)

FOREIGN PATENT DOCUMENTS

| | | |
|---|---|---|
| DE | 3038524 A1 | 4/1982 |
| DE | 9207498 U1 | 7/1992 |

(Continued)

OTHER PUBLICATIONS

PCT International Search Report for Application No. PCT/US2023/018593; Tortosa Masia, A, Authorized Officer; ISA/EPO; Jul. 5, 2023.
(Continued)

*Primary Examiner* — Ryan D Kwiecinski (57) ABSTRACT

An article comprises a tube and at least one thermoplastic pouch inserted within the tube wherein the tube comprises an upper section, a lower section, an inner section and an outer section, the tube comprises an inner layer and an outer layer, the inner layer being a permeable nonwoven fabric and the outer layer being a semipermeable membrane that is permeable to vapors but impermeable to liquids, the tube has a plurality of holes that penetrate through the inner and outer layers of the upper section and/or lower section of the tube, the pouch is located within the tube such that it contacts the lower and inner sections of the tube and the pouch contains a foamable composition.

23 Claims, 6 Drawing Sheets

(58) Field of Classification Search
CPC .............. E04B 2001/6818; B32B 1/08; B32B 2581/00; B29C 44/188; B29C 44/185; E04G 23/0203; E06B 2001/626
See application file for complete search history.

(56) References Cited

U.S. PATENT DOCUMENTS

| | | | |
|---|---|---|---|
| 5,890,560 A * | 4/1999 | Sloop .................. | E06C 1/34 |
| | | | 182/206 |
| 6,053,284 A * | 4/2000 | Fountain ............... | E06C 7/42 |
| | | | 182/180.2 |
| 6,089,350 A * | 7/2000 | Hankins ................ | E06C 7/46 |
| | | | 182/129 |
| 8,882,483 B2 | 11/2014 | O'Leary et al. | |
| D733,325 S * | 6/2015 | Robinson, Jr. ........... | D25/68 |
| 9,561,606 B2 | 2/2017 | O'Leary et al. | |
| 9,771,756 B1 * | 9/2017 | Gregoire ............... | E06C 7/42 |
| 10,384,378 B2 | 8/2019 | O'Leary et al. | |
| 10,619,416 B1 * | 4/2020 | Snell .................. | E06C 7/06 |
| 2008/0185225 A1 * | 8/2008 | Spengler ............... | E06C 7/423 |
| | | | 182/172 |
| 2011/0114418 A1 * | 5/2011 | Blazin ................. | E06C 7/06 |
| | | | 182/129 |
| 2011/0290587 A1 * | 12/2011 | Blazin ................. | E06C 7/188 |
| | | | 182/107 |
| 2012/0263817 A1 | 10/2012 | O'Leary et al. | |
| 2016/0153234 A1 * | 6/2016 | Mazanek ............... | E06C 7/188 |
| | | | 248/354.1 |
| 2017/0198522 A1 * | 7/2017 | Stewart ................ | E06C 7/42 |
| 2020/0190831 A1 | 6/2020 | Davlin et al. | |
| 2021/0180404 A1 * | 6/2021 | Gerbrandt .............. | E06C 7/423 |
| 2021/0198411 A1 | 7/2021 | Orf et al. | |

FOREIGN PATENT DOCUMENTS

| | | | | |
|---|---|---|---|---|
| DE | 202011051055 U1 | | 8/2012 | |
| EP | 0436145 A2 | | 7/1991 | |
| GB | 2172044 A | * | 9/1986 | ............... E06C 7/42 |
| GB | 2207176 A | * | 1/1989 | ............... E06C 7/42 |
| GB | 2330612 A | * | 4/1999 | ............... E06C 7/42 |
| GB | 2332697 A | * | 6/1999 | ............. B66F 7/243 |
| GB | 2344611 A | * | 6/2000 | ............. E06C 7/423 |
| GB | 2443827 A | * | 5/2008 | ............. E06C 7/423 |
| GB | 2445359 A | * | 7/2008 | ............... E06C 7/42 |
| GB | 2562743 A | * | 11/2018 | ............. E06C 7/188 |
| WO | WO-03080984 A1 | * | 10/2003 | ............... E06C 7/42 |
| WO | 2012100840 A1 | | 8/2012 | |
| WO | 2015057650 A1 | | 4/2015 | |
| WO | WO-2017027911 A1 | * | 2/2017 | ............... E06C 1/10 |
| WO | 2020123232 A1 | | 6/2020 | |
| WO | WO-2023070148 A1 | * | 5/2023 | ............... E06C 7/42 |

OTHER PUBLICATIONS

PCT International Search Report for Application No. PCT/US2023/019011; Tortosa Masia, A, Authorized Officer; ISA/EPO; Jul. 4, 2023.

PCT International Search Report for Application No. PCT/US2023/018594; Tortosa Masia, A, Authorized Officer; ISA/EPO; Jun. 28, 2023.

PCT International Search Report for Application No. PCT/US2023/019014; Tortosa Masia, A, Authorized Officer; ISA/EPO; Jun. 30, 2023.

PCT International Search Report for Application No. PCT/US2023/018598; Tortosa Masia, A, Authorized Officer; ISA/EPO; Jun. 26, 2023.

PCT International Search Report for Application No. PCT/US2023/019019; Tortosa Masia, A, Authorized Officer; ISA/EPO; Jul. 5, 2023.

PCT International Search Report for Application No. PCT/US2023/018600; Melhem, Charbel, Authorized Officer; ISA/EPO; Jul. 17, 2023.

PCT International Search Report for Application No. PCT/US2023/019023; Melhem, Charbel, Authorized Officer; ISA/EPO; Jul. 17, 2023.

* cited by examiner

FOAM ENVELOPE FOR SEALING LARGE VOLUMES

BACKGROUND OF THE INVENTION

1. Field of the Invention

The present invention relates to foams that are used to fill cavities, cracks, and crevices to enhance the sealing and insulating properties of buildings and, more particularly, to a foamable system that is contained within an enclosed envelope such as a tube that can be placed within the volume to be sealed. Such a system which reduces the installation time as well as the amount of foam raw material waste is desired by the market.

2. Description of Related Art

U.S. Pat. No. 10,384,378 to O'Leary et al describes a system for sealing large volumes or gaps that includes a flexible envelope that can assume the shape of the volume when filled with a foaming composition and that expands the envelope to the boundaries of the volume. The foaming composition may be integral with the envelope or delivered in bulk by an external device. The foaming composition may be one or multiple parts, typically two parts such as a polyisocyanate and a polyol, in which case it is necessary to keep the two parts separate until foaming is desired. Separation may be accomplished by providing multiple compartments that deliver components via a mixing device into the interior. The envelope may include ribs for structural strength and shaping and leak pores around its perimeter to enhance bonding and sealing. It may also include perforations for bulk, modular seals or for separation of portions of the envelope to seal irregular shapes.

U.S. Pat. No. 8,882,483 to O'Leary et al describes a system for sealing or insulating a large volume. The system includes an envelope having walls defining an interior. The interior is configured to receive a foaming composition. The envelope is initially configured in a retracted configuration. A foaming composition is configured for insertion into the interior of the envelope. The envelope is configured such that the foaming composition expands the envelope such as to fill a large gap.

U.S. Pat. No. 9,561,606 to O'Leary et al discloses a system for sealing large volumes or gaps and includes a flexible envelope that can assume the shape of the volume when filled with a foaming composition that expands the envelope to the boundaries of the volume. The foaming composition may be integral with the envelope or delivered in bulk by an external device. The foaming composition may be one or multiple parts, typically two parts such as a polyisocyanate and a polyol, in which case it is necessary to keep the two parts separate until foaming is desired. Separation may be accomplished by providing multiple compartments that deliver components via a mixing device into the interior. The envelope may include ribs for structural strength and shaping, and leak pores around its perimeter to enhance bonding and sealing. It may also include perforations for bulk, modular seals or for separation of portions of the envelope to seal irregular shapes.

United States Patent Application Publication Nr. 20210198411 to Certain Teed LLC teaches methods, devices and systems for insulation, e.g., of cavities associated with walls, ceilings, floors and other building structures, with foam insulation. In one aspect, the disclosure provides a method for providing a cavity of a building with an expanded foam insulation. The method includes dispensing an amount of an expanding foam insulation into the cavity, the expanding foam insulation being dispensable and expandable to provide the expanded foam insulation material, the expanding foam insulation material formed from a premix comprising at least one polyol, at least one polyisocyanate, a blowing agent, and an encapsulated catalyst, the encapsulated catalyst comprising a plurality of catalyst capsules, each comprising an amount of catalyst and a capsule shell encapsulating the catalyst, wherein the dispensing is performed to apply a force to the encapsulated catalyst sufficient to break capsules and release catalyst, the released catalyst initiating reaction between the at least one polyol and the at least one isocyanate; and then allowing the dispensed amount of expanding foam insulation to substantially finish expanding after it is dispensed in the cavity, thereby forming the expanded foam insulation in the cavity.

PCT Publication Number WO 2020123232 to Davlin et al discloses a method and system for the application of foam insulation onto a surface or into a cavity includes a sheet with an aperture where the sheet covers or partially covers the surface or a cavity with the aperture adjacent to the surface or cavity. A pressure-activated foam generator which generates foam is coupled with the sheet. The pressure-activated foam generator includes a frangible output seal with a ruptured position. The pressure-activated foam generator is positioned so that in the ruptured position the foam has a path from the frangible output seal through the aperture and onto the surface or into the cavity. The sheet is connected to cover or partially cover the surface or cavity, and the pressure-activated foam generator is activated and the foam flows onto the surface or into the cavity.

BRIEF SUMMARY OF THE INVENTION

This invention pertains to an article 10 comprising a tube 11 having a length L, a width W and a height H and at least one thermoplastic pouch 12 having a length l and a width w inserted within the tube wherein
- the tube comprises an upper section 13, a lower section 14, an inner section 15 and an outer section 16,
- the tube comprises an inner layer 17 and an outer layer 18, the inner layer 17 being a permeable nonwoven fabric and the outer layer 18 being a semipermeable membrane that is permeable to vapors but impermeable to liquids,
- the tube has a through-thickness direction Gurley air permeability of from 1 to 2,000 seconds,
- the tube has a tensile modulus in the L direction of from 300 to 450 MPa and from 200 to 320 MPa in the W direction,
- the tube has a plurality of holes that penetrate through the inner 17 and outer 18 layers of the upper section 13 and/or the lower section 14 of the tube 11,
- the pouch length l is greater than the width w,
- the pouch is located within the tube such that it contacts the lower 14 and inner 15 sections of the tube and the pouch extends in a direction across the tube width W to an extent $W_{max}$ that is no more than 45% across the tube width W and
- the pouch 12 contains a foamable composition.

Methods of using the article are also disclosed.

DETAILED DESCRIPTION OF THE INVENTION

Article

Figure 1:
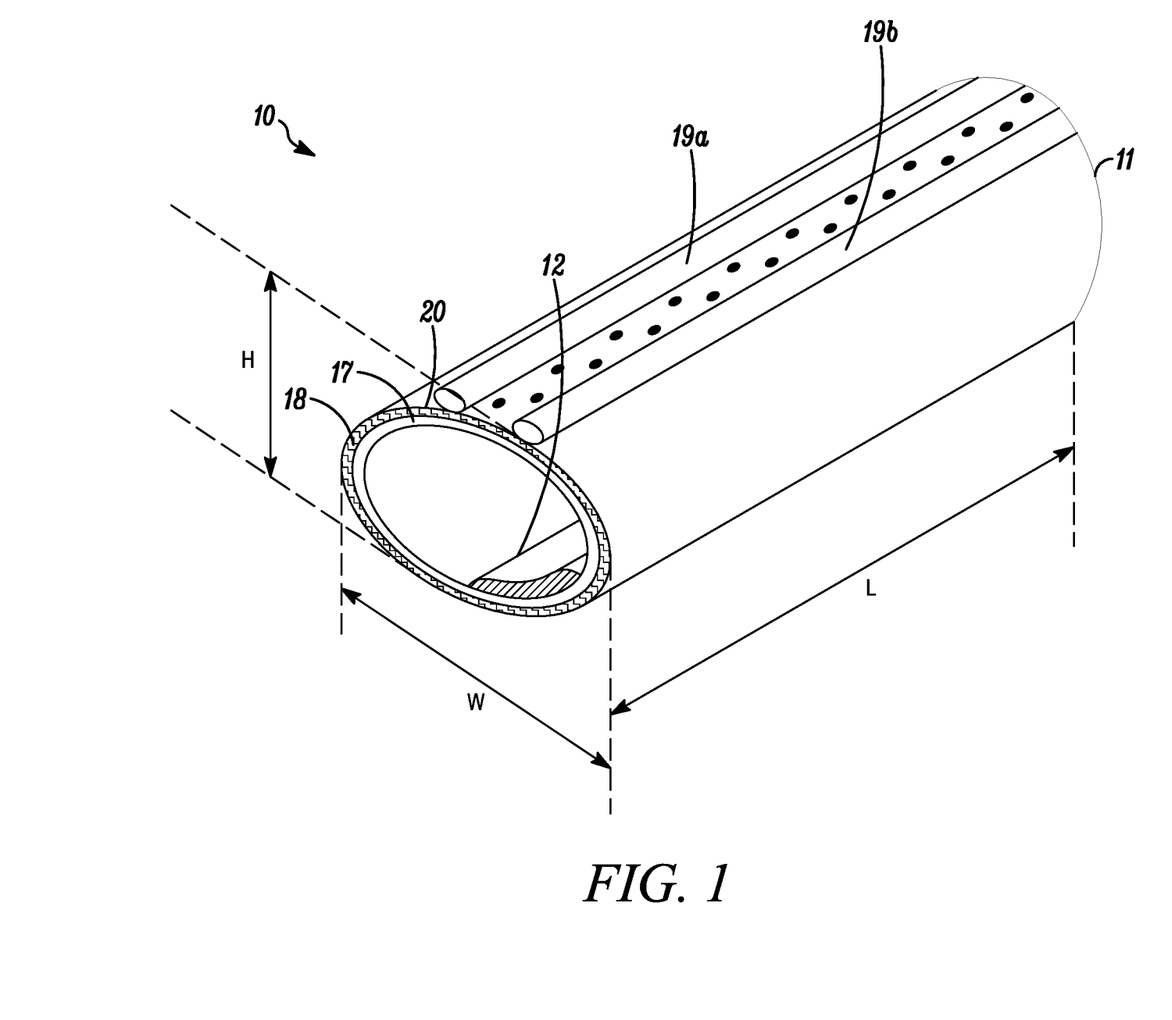
FIG. 1 is a perspective view of an article of this invention.

FIG. 1 shows generally at 10 an article comprising a tube 11 having a length L, a width W and a height H and at least one pouch 12 inserted within the tube. In some embodiments, the width W and the height H of the tube are of the same dimensions i.e. the tube has a circular cross section. The width W and/or height H of the tube may vary for differing applications. In one example a circular unexpanded tube may have an outer diameter of from 50 to 100 mm. The length L of the tube, as a minimum, has to be sufficient to cover the length of gap in the cavity to be filled with foam.

Tube

Figure 2:
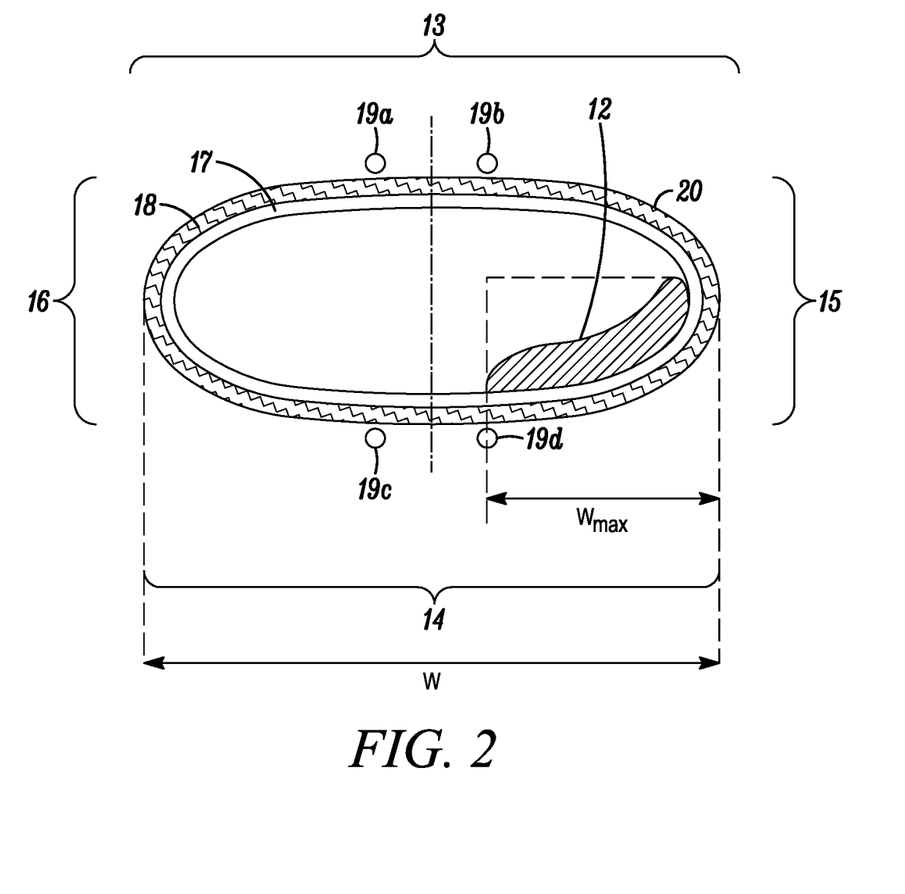
FIG. 2 is an end view of an article of this invention.

As shown in FIG. 2, the tube comprises an upper section 13, a lower section 14, an inner section 15 and an outer section 16. Inner section 15 faces into the building interior while outer section 16 faces externally. The tube comprises an inner layer 17 and an outer layer 18, the inner layer 17 being a nonwoven fabric the outer layer 18 is a semipermeable membrane such as a flash spun polyethylene nonwoven or microporous film, an SMS sheet or an SMMS sheet, the membrane being permeable to vapors but impermeable to liquids. An SMS sheet is a three layer structure comprising a spunbonded layer, a meltblown layer and a spunbonded layer. Although there are three component layers in an SMS sheet it is sold in the trade as a unitary roll good and therefor for the purpose of this document is considered to be a single layer 18. An SMMS sheet is a four layer structure comprising a spunbonded layer, two meltblown layers and a spunbonded layer. Although there are four component layers in an SMMS sheet it is sold in the trade as a unitary roll good and therefor, for the purpose of this document, is also considered to be a single layer 18.

The tube has a through-thickness direction Gurley air permeability of from 1 to 2000 seconds when measured according to EN ISO5636-5:2013. This range is sufficient to allow gas escape during the foam expansion process.

The tube must be sufficiently flexible to expand during the foaming process but not to an extent where the tube bursts. Tubes having a tensile modulus in the L direction of from 300 to 450 MPa and from 200 to 320 MPa in the W direction according to EN ISO 527-1:2019 meet this requirement. In some embodiments, the tube has a tensile modulus in the L direction of from 340 to 440 MPa and from 205 to 305 MPa in the W direction.

Except when the tube has a circular cross section, the upper and lower section 13 and 14 are of the same dimension and the inner and outer sections 15 and 16 are also of the same dimension but of a dimension less than that of the upper and lower sections 13 and 14. Preferably the ratio of the width of the tube W to the height of the tube H is from 20:1 to 2.3:1.

In some embodiments, the tube has, in the upper section 13 of the tube, two spaced apart flow restrictors 19a and 19b extending along the length of the tube that are attached to the outer surface 20 of the outer layer 18 of the tube. These flow restrictors are shown in both FIGS. 1 and 2.

In other embodiments, the tube has in the lower section 14 of the tube two spaced apart flow restrictors 19c and 19d extending along the length of the tube that are attached to the outer surface 20 of the outer layer 18 of the tube. These flow restrictors are shown in FIG. 2.

In yet another embodiment, the tube has two spaced apart flow restrictors 19a and 19b the upper section and two spaced apart flow restrictors 19c and 19d in the lower section 14 of the tube, these four flow restrictors extending along the length of the tube and are attached to the outer surface 20 of the outer layer 18 of the tube.

The tube has a plurality of holes, shown as black dots in FIG. 1, that penetrate through the inner 17 and outer 18 layers of the tube in the upper section 13 and/or the lower section 14 of the tube and, when the two spaced apart flow restrictors 19a and 19b are present in the upper section 13 of the tube and/or when the two spaced apart flow restrictors 19c and 19d are present in the lower section 14 of the tube, the holes are restricted to that part of the tube that is between the two spaced apart flow restrictors 19a and 19b and/or the two spaced apart flow restrictors 19c and 19d. The holes may be circular, square, rectangular, hexagonal or some other shape and are arranged in a random, linear or some other arrangement. A preferred pattern is two rows of lines about 10 mm apart. Typically, the holes have an area of from about 2 to 10 mm$^2$ and the separation between holes is from about 4 to 30 mm.

Figure 3:
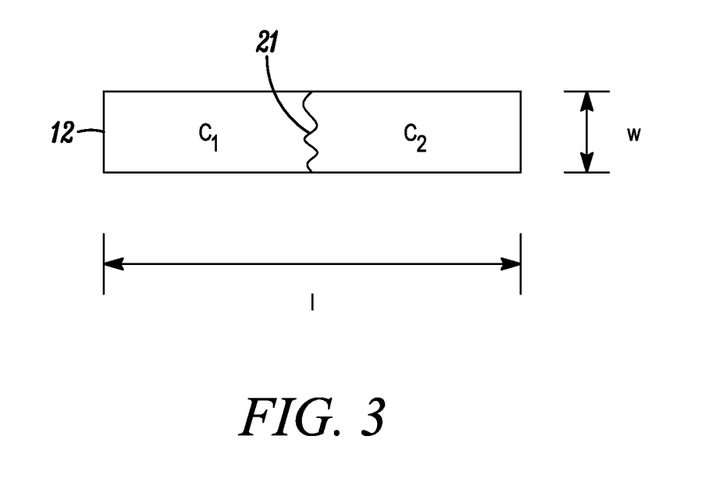
FIG. 3 is a plan view of one embodiment of a pouch.
Figure 7:
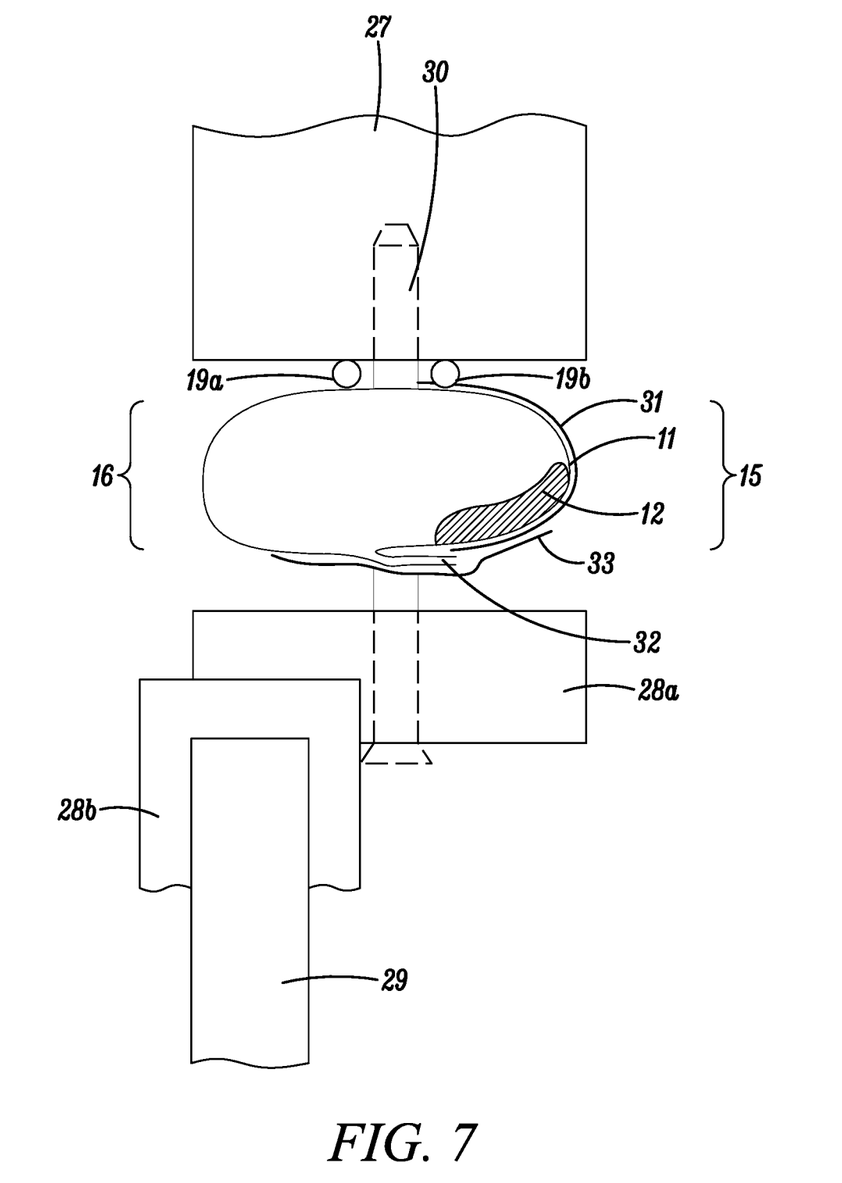
FIG. 7 is an end view of a window to building wall interface with a tube inserted into the air gap between the window and the building wall.

In a preferred embodiment, the inner layer 17 of the tube 11 is a nonwoven fabric of spunbonded polypropylene fiber, an exemplary material being available under the tradename Typar® also from DuPont de Nemours Inc., Wilmington, DE. In some embodiments, the polymer of the fiber has a density of from 240 to 430 kg/m$^3$ In another embodiment, the outer layer 18 is a nonwoven sheet of flash spun polyethylene fiber, an exemplary material being available under the tradename Tyvek® also from DuPont. In some embodiments, the polymer of the fiber has a density of from 930 to 970 kg/m$^3$ Pouch The pouch 12 is thermoplastic and, as shown in FIG. 3, has a length l and a width w, the length l being greater than the width w. The pouch 12 is located within the tube 11 such that it contacts the lower 14 and inner 15 sections of the tube. As shown in FIG. 2, the width of the pouch extends in a direction across the tube width W to an extent $W_{max}$ that is no more than 45% of the tube width W. This is a desirable feature as it prevents the pouch being punctured during installation of the tube in an air gap. For example, FIG. 7 shows a typical installation where part of a building wall is shown as 27, part of the window frames are shown as 28a and 28b with a windowpane being 29. Tube 11 is inserted between the wall 27 and window frame 28a. A fixing means 30 such as nails or screws connects window frame 28a with wall 27 and holds the window assembly in place. The fixing means 30 passes through tube 11 and, when present, between the two flow restrictors 19a and 19b and/or the two flow restrictors 19c and 19d. By limiting the extent to which the pouch extends in a direction across the tube width W to a value where $W_{max}$ is no more than 45% of the tube width W, the risk of the fixing means puncturing the pouch is eliminated.

The pouch 12 contains a foamable composition.

Preferably, there are a plurality of pouches 12 within the tube 11. The spacing between adjacent pouches can vary but typically can be between 50 to 1000 mm, preferably from 400 to 600 mm and more preferably from 450 to 550 mm or even 300 to 500 mm. Preferably adjacent pouches are connected to each other by a connecting means such as a thermoplastic tape or ribbon.

In one embodiment all the components of the foamable composition are in one pouch but remain inactive until a reaction initiation step is activated. Reaction initiation may be by means such as ultrasonic, gas pressure blast, thermal heat or suitable frequencies in the electromagnetic spectrum such as infra-red or ultra-violet.

Figure 4:
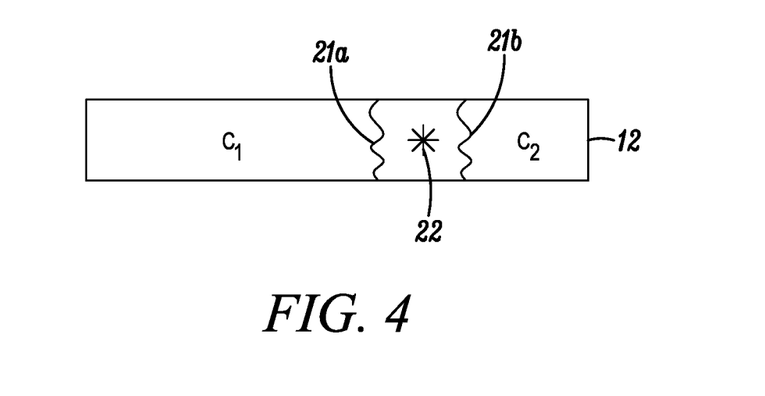
FIG. 4 is a plan view of another embodiment of a pouch.
Figure 5:
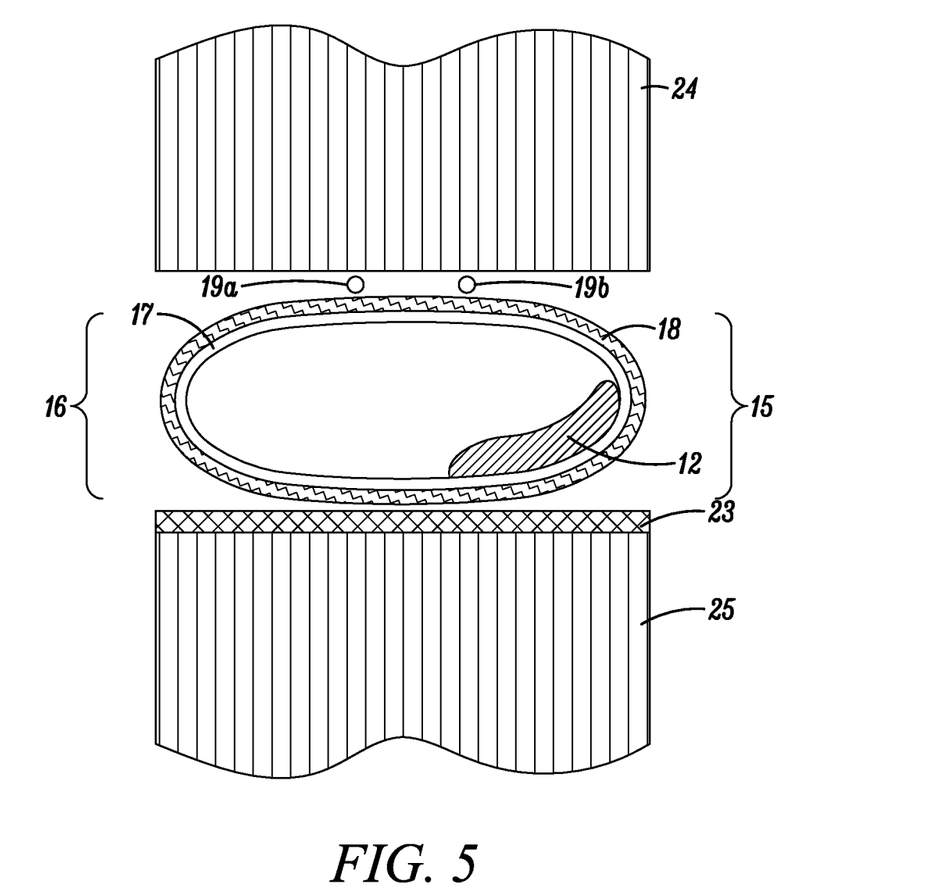
FIG. 5 is an end view of an article inserted into an air gap space between building interfaces.

In another embodiment, as shown in FIGS. 3 and 4, the pouch 12 comprises first $C_1$ and second $C_2$ compartments, the compartments being separated by at least one frangible barrier 21 and wherein the first compartment $C_1$ contains a first foamable composition component and the second compartment $C_2$ contains a second foamable composition component. In FIG. 3, there is only one frangible barrier 21 while in FIG. 4 there are two frangible barriers 21a and 21b separating the first and second compartments.

In one embodiment, the first and second compartments $C_1$ and $C_2$ are each about 70 mm long, 30 mm wide and 12 mm thick. In some embodiments, the first and second compartments may be of different lengths.

Where there are a plurality of pouches, they may be of the same or differing lengths.

By frangible barrier we mean a material that separates the two compartments but may be easily broken by a breaking means to allow the chemical components of the two compartments to be intimately mixed and react to form a foam. Suitable materials for the frangible barrier include ethylene copolymer ionomer such as Surlyn® which is available from Dow, Midland, MI. Suitable breaking means include mechanical, ultrasonic, gas pressure blast, thermal heat, or suitable frequencies in the electromagnetic spectrum such as infra-red or ultra-violet. Exemplary mechanical breaking means are hand manipulation, a hammer, roller or rod pulling.

In one embodiment as depicted in FIG. 4, there is a static mixer 22 located between the two spaced apart frangible barriers 21a and 21b that separate the first and second compartments. A static mixer is a well-known device in fluid mixing arts. In some embodiments the pouch construction is a multi-layer assembly of, for example, from 3 to 7 or from 4 to 6 components. An exemplary structure for a pouch is an ionomeric resin layer such as Surlyn(R), a first adhesive or tie layer, a first polyester layer, a second adhesive or tie layer and a second polyester layer. The second polyester layer may have a metallic coating deposited on its outer surface the coating being about 30 nanometers thick. A preferred metallic material is aluminum. An alternative to the second polyester layer is a metallic foil such as aluminum having a typical thickness of about 50 micrometers.

A suitable adhesive is Bynel®. Another exemplary structure comprises a Surlyn® layer, a Bynel® adhesive layer, an ethylene vinyl alcohol (EVOH) copolymer layer, a Bynel® adhesive layer, a low density polyethylene (LDPE) layer and an oriented polyethylene (OPET) layer.

Preferably, as shown at 32 in FIG. 7, the two edges of the tube 11 are sealed by a suitable means such as adhesive bonding or ultrasonic welding. Also shown in FIG. 7 is a vapor control layer or liquid sealant 31 that covers the inner section 15 of the tube 11 and partially extends onto the upper 13 and lower 14 sections of the tube 11. This vapor control layer may be made from polyethylene, ethylene vinyl alcohol copolymer (EVOH) or polyvinyl alcohol (PVOH) or a metallic foil such as aluminum.

Foamable Composition

Figure 6:
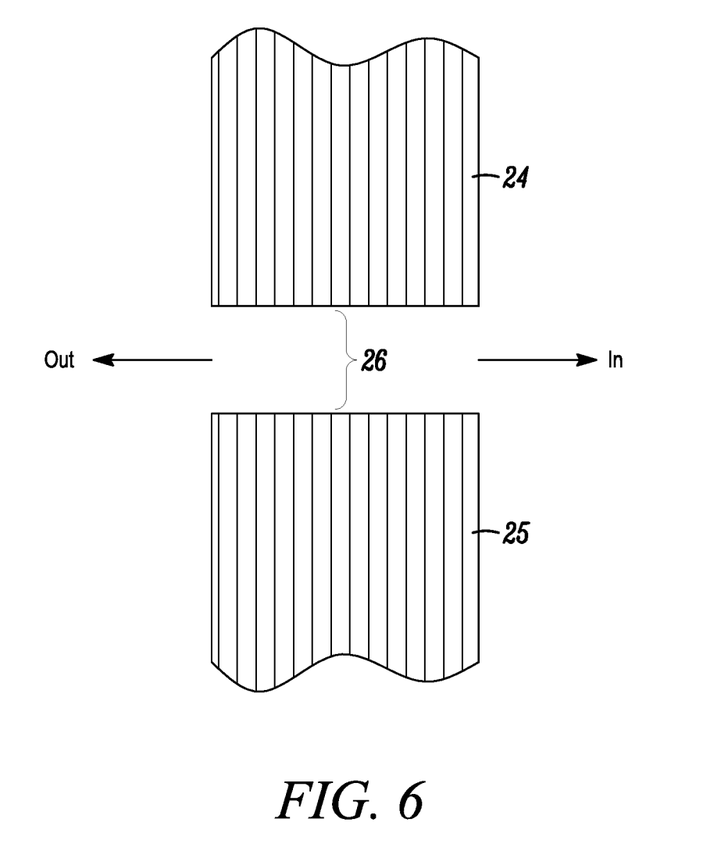
FIG. 6 is an end view of a building interface.

By foamable composition is meant a composition that when all the ingredients are combined and a reaction initiated or activated, the components of the foamable composition within the pouch 12 react to form an expandable foam, the foam then bursting the pouch 12, expanding the tube 11 and escaping through the tube holes in the upper section 13 and/or lower section 14 of the tube and, when present, between the two spaced apart flow restrictors 19a and 19b and/or 19c and 19d that extend along the length of the tube so as to fill, as in FIG. 6, the air gap 26 between the building interfaces 24 and 25 of the building structure and then cure in situ thus providing an air tight and water impermeable seal.

In an embodiment where the pouch comprises first $C_1$ and second $C_2$ compartments, the first foamable composition component in the first compartment $C_1$ comprises isocyanate and the second foamable composition component in the second compartment $C_2$ comprises polyol. The isocyanate composition may be formulated to have a monomeric diisocyanate content of less than 1 weight percent or even less than 0.1 weight percent, such formulations being well known in the trade. The second foamable composition component may further comprise a catalyst and/or a blowing agent.

In some embodiments, the composition may also comprise particles having a major dimension no greater than 1 mm to act as nuclei for cell formation thus yielding smaller pore sizes in the expanded foam. Exemplary particles are graphite, micro-balloons and calcite. For a polyurethane foam composition, these additional particles are incorporated into the second foamable composition component (polyol). Non-polyurethane two part chemistries are also suitable as foaming compositions, for example one based on an epoxy system or one based on a silicon system. In this instance the nucleating particles are kept separate from both major components until the time for mixing. This requires that these particles are located in a third compartment such as is shown between the two frangible barriers 21a and 21b in FIG. 4. Other particles may function to aid mixing of the reagents. For example, ferromagnetic or magnetic particles can enhance mixing when an external magnetic source is applied. This source may be a magnetic field or a magnetic rod. Other particles may be responsive to an external ultrasound source and in turn enhance mixing.

Other functionality enabling additives are flame retardants, pigments and fillers such as fibers, filaments, fibrils and pulps such as those of glass or aramid. In some embodiments, the addition of p-aramid pulp present in an amount of from 0.05 to 3.0 weight percent of the foamed composition has been shown to be beneficial. This type of pulp comprises highly fibrillated chopped p-aramid fibers having a length no greater than 1,000 micrometers. Preferably the fiber diameter is about 50 micrometers. The pulp may be added to either the first foamable composition component, the isocyanate, or the second foamable composition component, the polyol. Foamed polyurethane compositions incorporating p-aramid pulp exhibits increased compressive strength and compressive modulus with similar expansion and acceptable flexibility when compared with foamable compositions in which the pulp additive is absent. This increased compression or modulus enhances shock absorption properties in sealed gaps in fenestrations, a desirable feature in buildings where, for example, window expansion occurs in hot weather.

A desired property of the expanded foam is that it should be sufficiently flexible to compress to at least 10%, more preferably to at least 20% or even to at least 50% when tested according to standard EN 826:2013.

Another desired feature of the foam is that one week after expansion, the foam shrinkage should be no more than 20% and preferably no more than 10% of the original expanded foam dimensions when tested based on methods disclosed in standard EN 1604:2013. This evaluation is carried out at ambient temperature as well as in temperature cycles from −10 to +50° C.

In some embodiments, the foamable materials contained in each pouch are the same. In some other embodiments, the foamable materials contained in one pouch are different from the foamable materials contained in another pouch, for example, some pouches may contain foamable materials that on reacting provide a foam that is of higher density but lower expansion than foams created from other pouches wherein the foamable materials contained in these other pouches are of a different chemical composition. Such a feature could reduce or even eliminate the need for mechanical fixation of windows by nails or screws.

Utility

The invention described above finds utility in new construction or in refurbishment of existing buildings where there is a gap to be filled. Typical applications include sealing of air gaps between a window and wall, between a door and wall, between a wall and roof, between two walls and gap sealing between two adjacent pre-fabricated building panels or modules. These are sometimes referred to as building interfaces.

Method of Sealing an Airgap Between Building Interfaces

In one embodiment, a method for sealing an air gap 26 between building interfaces 24 and 25 comprises the steps of:
  providing an article 10 comprising a tube 11 and at least one thermoplastic pouch 12 inserted within the tube 11 wherein
    the tube 11 has a length L, a width W and a height H and the at least one thermoplastic pouch 12 has a length l and a width w wherein,
    the tube comprises an upper section 13, a lower section 14, an inner section 15 and an outer section 16,
    the tube comprises an inner layer 17 and an outer layer 18, the inner layer 17 being a nonwoven fabric and the outer layer 18 being a semipermeable membrane that is permeable to vapors but impermeable to liquids,
    the tube has a through-thickness direction Gurley air permeability of from 1 to 2,000 seconds,
    the tube has a tensile modulus in the L direction of from 300 to 450 MPa and from 200 to 320 MPa in the W direction,
    the tube has a plurality of holes that penetrate through the inner 17 and outer 18 layers of the upper section 13 and/or lower section 14 of the tube,
    the pouch length l is greater than the width w,
    the pouch is located within the tube such that it contacts the lower 14 and inner 15 sections of the tube and the pouch extends in a direction across the tube width W to an extent $W_{max}$ that is no more than 45% across the tube width W and
    the pouch 12 contains a foamable composition,
  inserting the article 10 into the air gap 26 between the building interfaces 24 and 25,
  activating the foamable composition within the pouch 12 so that the ingredients of the foamable composition react to form an expandable foam, the foam then bursting the pouch 12, expanding the tube 11 and escaping through the tube holes located in the upper section 13 and/or lowers section 14 of the tube and, when present, between two spaced apart flow restrictors 19a and 19b in the upper section 13 of the tube and/or two spaced apart flow restrictors 19c and 19d in the lower section 14 of the tube, the flow restrictors extending along the length of the tube, the expanding foam filling the air gap 26 between the building interfaces 24 and 25 of the building structure and then curing in situ into a foam structure that provides an air tight and water impermeable seal.

In some embodiments, the foamable materials contained in one pouch differ from the foamable materials contained in another pouch, An optional step in the above method is, prior to inserting the tube 11 into the air gap 26, to apply a bonding means to either the lower section 14 of the tube 11 or the upper surface 23 of the building interface. This bonding means which may be for example a double sided tape 33 or a hot melt adhesive helps to hold the tube in the correct position.

In an alternative embodiment, a method for sealing an air gap 26 between building interfaces 24 and 25 comprises the steps of:
  providing an article 10 comprising a tube 11 and at least one thermoplastic pouch 12 inserted within the tube 11, the pouch 12 comprising first $C_1$ and second $C_2$ compartments, the compartments being separated by at least one frangible barrier 21 or two frangible barriers 21a and 21b, wherein the tube comprises an upper section 13, a lower section 14, an inner section 15 and an outer section 16, wherein
    the tube comprises an inner layer 17 and an outer layer 18, the inner layer 17 being a permeable nonwoven fabric and the outer layer 18 being a semipermeable membrane that is permeable to vapors but impermeable to liquids,
    the tube has a through-thickness direction Gurley air permeability of from 1 to 2,000 seconds,
    the tube has a tensile modulus in the L direction of from 300 to 450 MPa and from 200 to 320 MPa in the W direction,
    the tube has a plurality of holes that penetrate through the inner 17 and outer 18 layers of the upper section 13 and/or lower section 14 of the tube,
    the pouch length l is greater than the width w,
    the pouch is located within the tube such that it contacts the lower 14 and inner 15 sections of the tube and the pouch extends in a direction across the tube width W to an extent $W_{max}$ that is no more than 45% across the tube width W and
    the pouch 12 contains a foamable composition,
  inserting the article 10 into the air gap between the building interfaces 24 and 25,
  activating the foamable composition within the pouch by breaking the frangible barriers 21 or 21a and 21b separating the first $C_1$ and second $C_2$ sections of each compartment of the pouch 12 by a breaking means thereby allowing the first and second compositions to mix, react and form an expandable foam, the foam then bursting the pouch 12, expanding the tube 11 and escaping through the tube holes located in the upper section 13 and/or lower section 14 of the tube 11 and, when present, between the two spaced apart flow restrictors 19a and 19b and/or 19c and 19d that extend along the length of the tube 11 so as to fill the air gap 26 between the building interfaces 24 and 25 of the building structure and then cure in situ into a foam structure that provides an air tight and water impermeable seal.

The breaking means may be mechanical, ultrasonic, gas pressure blast, thermal heat, or suitable frequencies in the electromagnetic spectrum such as infra-red or ultra-violet. Exemplary mechanical breaking means include hand manipulation, a hammer, roller or rod pulling.

In some embodiments, the foamable materials contained in one pouch differ from the foamable materials contained in another pouch.

An optional step in the above method is, prior to inserting the tube 11 into the air gap 26, to apply a bonding means to either the lower section 14 of the tube 11 or the upper surface 23 of the building interface. This bonding means which may be for example a double sided tape or a hot melt adhesive helps to hold the tube in the correct position.

Test Methods

Free rise density of the foam was measured according to ASTM D7487-13: Standard Practice for Polyurethane Raw Materials: Polyurethane Foam Cup Test.

Dynamic compressive strength and compressive modulus of the foam was measured according to EN ISO 844-2021: Rigid Cellular Plastics.

EXAMPLES

All parts and percentages are by weight unless otherwise indicated. Examples prepared according to the current invention are indicated by numerical values. Control or Comparative Examples are indicated by letters.

The article of Example 1 may be evaluated in an air gap space between two building components. This space has nominal dimensions of a length of 4.2 m, a width of 77 mm and a thickness of 25 mm.

Comparative Example A was evaluated in an air gap space between two building components. This space had nominal dimensions of a length of 4.2 m, a width of 77 mm and a thickness of 25 mm.

In Example 1, the outer layer 18 may be Tyvek® window tape grade 1310PT, a polyethylene terephthalate—polyamide nonwoven film available from DuPont de Nemours Inc, Wilmington, DE. The inner layer 17 may be a 60 gsm sheet of Typar® SF20 which is also from DuPont. Example 1 had 2 mm diameter holes arranged in two separated lines in a zig-zag pattern in the upper section 13 of the tube.

The foamable material can consist of four pouches of Instapak® QuickRT® packaging foam from Sealed Air Corporation, Elmwood Park, NJ. Each pouch comprises two compartments separated by a frangible barrier, one compartment comprising polyol and the other compartment comprising isocyanate. Two of the pouches comprise 75 g of reactive material and two of the pouches comprise 100 g of reactive material giving a total foamable composition of 350 g. The frangible barrier may be broken by hand manipulation thus allowing the reagents to react and form the foam.

Comparative Example A represents the current state of art in the trade and consisted of injecting a one component polyurethane foam sealant, InstaStik Flex+ from DuPont, into the gap and allowing the foamable material to expand, cure and harden. Any foam extending beyond the plane of the exterior surfaces of the two building components was removed and smoothed flush. A DuPont Tyvek® window tape sealant grade 1310 PT was then applied over the smoothed foam to overlap the building components. The foam amount was 375 g.

Measured installation time included preparation work, installing the pouches, foam activation or application, foam expansion and cure, finishing steps and application of flashing. Examples were considered to be satisfactory and beneficial to the trade if the installation time was 30 minutes or less. Example 1 will have an installation time of less than 30 minutes while the installation time for Comparative Example A was about 60 minutes.

Additional Improvements

An advantage of obtaining enhanced compressive tensile and modulus performance from the cured foam was achieved by the addition of p-aramid pulp to the foamable composition. The pulp which was DuPont merge 1K1957 had a nominal fiber diameter of 50 micrometers and fiber length of less than 1 mm. The pulp was added to the polyol component of an isocyanate-polyol foamable composition such that it comprised 0.4 (Example 2) or 0.8 weight percent (Example 3) of the composition. The isocyanate (Voronate™ M230) comprised 60 weight percent of the foamable composition with the polyol component comprising the remaining 40 weight percent. The polyol component comprised 32 weight percent of Voranol™ polyether polyol, 6 weight percent of water and 2 weight percent of catalyst. The amount of polyol was reduced by 0.4 or 0.8 weight percent in the examples comprising the p-aramid pulp. The sample without the pulp ingredient was a control example (Comparative Example B). These compositions were foamed and test coupons subjected to compression and modulus tests. The resultant values were normalized to address variations in foam density (free rise density) of the test samples.

The basis for the testing was EN ISO 844-2021. The foamed test samples were 16 mm thick and each was compressed by 3 mm. The dynamic compressive strength was determined by applying a strain of 18.75% then the compressive load was released for 60 seconds. This procedure was repeated four more times. The compressive modulus is determined as per the EN ISO 844-2021 standard. The results are shown in Table 1.

TABLE 1

| Feature | Comp. Ex B | Example 2 | Example 3 |
|---|---|---|---|
| Pulp Content (%) | 0 | 0.4 | 0.8 |
| Free Rise Density (kg/m$^3$) | 21 | 22 | 37 |
| Dynamic Compressive Strength (kPa) | 5.6 | 7.6 | 26.6 |
| Normalized Compressive Strength (kPa · m$^3$/kg) | 0.26 | 0.34 | 0.71 |
| Compressive Modulus (kPa) | 28 | 50.8 | 135.7 |
| Normalized Compressive Modulus (kPa · m$^3$/kg) | 1.33 | 2.31 | 3.66 |

The invention claimed is:

1. An article (10) comprises a tube (11) having a length (L), a width (W) and a height (H) and at least one thermoplastic pouch (12) having a length (l) and a width (w) inserted within the tube wherein the tube comprises an upper section (13), a lower section (14), an inner section (15) and an outer section (16), the tube comprises an inner layer (17) and an outer layer (18), the inner layer (17) being a permeable nonwoven fabric and the outer layer (18) being a semipermeable membrane that is permeable to vapors but impermeable to liquids, the tube has a through-thickness Gurley air permeability of from 1 to 2,000 seconds, the tube has a tensile modulus in the L direction of from 300 to 450 MPa and from 200 to 320 MPa in the W direction, the tube has a plurality of holes that penetrate through the inner (17) and outer (18) layers of the upper section (13) and/or the lower section (14) of the tube, the pouch length (l) is greater than the width (w), the pouch is located within the tube contacting the lower (14) and inner (15) sections of the tube and the pouch extends in a direction across the tube width (W) to an extent ($W_{max}$) that is no more than 45% across the tube width (W) and the pouch (12) contains a foamable composition.

2. The article (10) of claim 1 wherein the width (W) and the height (H) of the tube are of the same dimensions.

3. The article (10) of claim 1 wherein the tube (11) has, in the upper section (13) of the tube, two spaced apart flow restrictors (19a) and (19b) and/or in the lower section (14) two spaced apart flow restrictors (19c) and (19d) the flow restrictors extending along the length of the tube and are attached to an outer surface (20) of the outer layer (18) of the tube and wherein the holes that penetrate through the inner (17) and outer (18) layers of the upper section (13) or lower section (14) of the tube are restricted to that part of the tube that is between the two spaced apart flow restrictors (19a) and (19b) and/or (19c) and (19d).

4. The article (10) of claim 1 wherein the outer layer (18) of the tube (11) is a nonwoven sheet of flash spun polyethylene fiber.

5. The article (10) of claim 1 wherein the inner layer (17) of the tube (11) is a nonwoven fabric of spunbonded polypropylene fiber.

6. The article (10) of claim 1 wherein the ratio of the width of the tube (W) to the height of the tube (H) is from 20:1 to 2.3:1.

7. The article (10) of claim 1 wherein the at least one thermoplastic pouch (12) includes a first thermoplastic pouch and a second thermoplastic pouch, and wherein the foamable composition contained in the first thermoplastic pouch differs from the foamable composition contained in the second thermoplastic pouch.

8. The article (10) of claim 1 wherein the at least one thermoplastic pouch (12) comprises first ($C_1$) and second ($C_2$) compartments, the compartments being separated by at least one frangible barrier (21) and wherein the first compartment ($C_1$) contains a first foamable composition component and the second compartment ($C_2$) contains a second foamable composition component.

9. The article (10) of claim 8 wherein the first foamable composition component comprises isocyanate.

10. The article (10) of claim 9 wherein the first foamable composition component further comprises p-aramid pulp present in an amount of from 0.05 to 3.0 weight percent of the foamable composition.

11. The article (10) of claim 8 wherein the second foamable composition component comprises polyol.

12. The article (10) of claim 11 wherein the second foamable composition component further comprises a catalyst and/or a blowing agent.

13. The article (10) of claim 11 wherein the second foamable composition component further comprises p-aramid pulp present in an amount of from 0.05 to 3.0 weight percent of the foamable composition.

14. The article (10) of claim 8 wherein there are two spaced apart frangible barriers (21a) and (21b) separating the first ($C_1$) and second ($C_2$) compartments of the pouch (12).

15. The article (10) of claim 14 wherein a static mixer (22) is located between the two spaced apart frangible barriers (21a) and (21b) that separate the first and second compartments.

16. The article (10) of claim 1 further comprising a vapor control layer or liquid sealant (31) that covers the inner section (15) of the tube (11) and partially extends onto the upper (13) and lower (14) sections of the tube (11).

17. The article (10) of claim 16 wherein the vapor control layer is polyethylene, ethylene vinyl alcohol copolymer, polyvinyl alcohol, or a metallic foil.

18. The article (10) of claim 1 wherein the at least one thermoplastic pouch (12) includes a first thermoplastic pouch and a second thermoplastic pouch, and wherein the foamable composition contained in the first thermoplastic pouch differs from the foamable composition contained in the second thermoplastic pouch.

19. A method for sealing an air gap (26) between building interfaces (24) and (25), the method comprises the steps of:

providing an article (10) comprising a tube (11) and at least one thermoplastic pouch (12) inserted within the tube (11) wherein the tube (11) has a length (L), a width (W) and a height (H) and the at least one thermoplastic pouch (12) has a length (l) and a width (w), the tube comprises an upper section (13), a lower section (14), an inner section (15) and an outer section (16), the tube comprises an inner layer (17) and an outer layer (18), the inner layer (17) being a permeable nonwoven fabric and the outer layer (18) being a semipermeable membrane that is permeable to vapors but impermeable to liquids, the tube has a through-thickness Gurley air permeability of from 1 to 2,000 seconds, the tube has a tensile modulus in the L direction of from 300 to 450 MPa and from 200 to 320 MPa in the W direction, the tube has a plurality of holes that penetrate through the inner (17) and outer (18) layers of the upper section (13) and/or the lower section (14) of the tube, the pouch length (l) is greater than the width (w), the pouch is located within the tube contacting the lower (14) and inner (15) sections of the tube and the pouch extends in a direction across the tube width (W) to an extent ($W_{max}$) that is no more than 45% across the tube width (W) and the pouch (12) contains a foamable composition, inserting the article (10) into the air gap (26) between the building interfaces (24) and (25), activating the foamable composition within the pouch (12) so that the ingredients of the foamable composition react to form an expandable foam, the foam then bursting the pouch (12), expanding the tube (11) and escaping through the tube holes in the upper section (13) and/or the lower section (14) of the tube and, when present, between two spaced apart flow restrictors (19a) and (19b) and/or two spaced apart flow restrictors (19c) and (19d) that extend along the length of the tube, so as to fill the air gap (26) between the building interfaces (24) and (25) of the building structure and then cure in situ into a foam structure thus providing an air tight and water impermeable seal.

20. A method for sealing an air gap (26) between building interfaces (24) and (25), the method comprises the steps of:
providing an article (10) comprising a tube (11) and at least one thermoplastic pouch (12) inserted within the tube (11) wherein
the tube (11) has a length (L), a width (W) and a height (H) and the at least one thermoplastic pouch (12) has a length (l) and a width (w),
the tube comprises an upper section (13), a lower section (14), an inner section (15) and an outer section (16),
the tube comprises an inner layer (17) and an outer layer (18), the inner layer (17) being a permeable nonwoven fabric and the outer layer (18) being a semipermeable membrane that is permeable to vapors but impermeable to liquids,
the tube has a through-thickness direction Gurley air permeability of from 1 to 2,000 seconds,
the tube has a tensile modulus in the L direction of from 341 to 441 MPa and from 207 to 308 MPa in the W direction,
the tube has a plurality of holes that penetrate through the inner (17) and outer (18) layers of the upper section (13) and/or the lower section (14) of the tube,
the pouch length (l) is greater than the width (w),
the pouch (12) is located within the tube contacting the lower (14) and inner (15) sections of the tube and the pouch extends in a direction across the tube width (W) to an extent ($W_{max}$) that is no more than 45% across the tube width (W),
the pouch (12) comprises first ($C_1$) and second ($C_2$) compartments, the compartments being separated by at least one frangible barrier (21) or (21a) and (21b),
the pouch (12) contains a foamable composition,
inserting the article (10) into the air gap between the building interfaces, activating the foamable composition within the pouch by breaking the at least one frangible barrier separating the first ($C_1$) and second ($C_2$) compartment of the pouch (12) by a breaking means thereby allowing the first and second compositions to mix, react and form an expandable foam, the foam then bursting the pouch (12), expanding the tube (11) and escaping through the tube holes in the upper section (13) and/or the lower section (14) of the tube (11) and, when present, between the two spaced apart flow restrictors (19a) and (19b) and/or (19c) and (19d) that extend along the length of the tube (11), so as to fill the air gap (26) between the building interfaces (24) and (25) of the building structure and then cure in situ into a foam structure thus providing an air tight and water impermeable seal.

21. The method of claim 19 or 20 wherein the at least one thermoplastic pouch (12) includes a first thermoplastic pouch and a second thermoplastic pouch, and wherein the foamable composition contained in the first thermoplastic pouch differs from the foamable composition contained in the second thermoplastic pouch.

22. The method of claim 20 wherein the breaking means is mechanical, ultrasonic, gas pressure blast, thermal heat or frequencies in the electromagnetic spectrum.

23. The method of claim 22 wherein the mechanical breaking means is hand manipulation, a hammer, roller, or rod pulling.

* * * * *